(12) United States Patent
Mori et al.

(10) Patent No.: US 6,512,582 B1
(45) Date of Patent: Jan. 28, 2003

(54) WAVELENGTH TRACKING SYSTEM USING AN OPTICAL SPECTRUM ANALYZER AND A WAVELENGTH TUNABLE LIGHT SOURCE

(75) Inventors: Tohru Mori, Tokyo (JP); Seiji Funakawa, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 09/526,346

(22) Filed: Mar. 16, 2000

(30) Foreign Application Priority Data

Mar. 31, 1999 (JP) ............................. 11-094232

(51) Int. Cl.[7] .............................. G01J 3/06; G01J 3/12
(52) U.S. Cl. ..................... 356/308; 356/326; 356/332
(58) Field of Search ........................... 356/300, 326, 356/328, 332, 334, 308

(56) References Cited

U.S. PATENT DOCUMENTS 4,037,960 A * 7/1977 Macemon ................... 356/332

FOREIGN PATENT DOCUMENTS

DE  4234071 A1  4/1994
GB  2 293 650 A  4/1996

* cited by examiner

*Primary Examiner*—F. L. Evans
(74) *Attorney, Agent, or Firm*—Fish & Richardson P.C.

(57) ABSTRACT

In order to start sweeping an optical spectrum analyzer 1 and a wavelength tunable light source 14 on the same timing, a motor 6 for driving a spectroscope 4 in the optical spectrum analyzer 1 is controlled. To this end, a drive circuit 7 outputs a control signal to determine the timing where the motor 6 starts to rotate. A wavelength control circuit 19 in the wavelength tunable light source 14 controls the sweep of the wavelength of single-mode oscillation from a light source unit 20 and starts sweeping the light source unit 20 in response to a signal externally supplied to control the timing of sweep start. As a result, the sweep of the wavelength being measured with the optical spectrum analyzer 1 and that of the wavelength of single-mode oscillation from the wavelength tunable light source 14 are started on the same timing and high-speed sweep is achieved.

17 Claims, 5 Drawing Sheets

WAVELENGTH TRACKING SYSTEM USING AN OPTICAL SPECTRUM ANALYZER AND A WAVELENGTH TUNABLE LIGHT SOURCE

BACKGROUND OF THE INVENTION

1. Field of the Invention

The present invention relates to the technology of measuring the wavelength characteristics of an optical filter and a light transmission channel using an optical spectrum analyzer which measures the spectra of optical signals and a wavelength tunable light source capable of outputting light at different wavelengths.

2. Description of the Related Art

FIG. 4 is a block diagram showing the configuration of a prior art wavelength tracking system using an optical spectrum analyzer and a wavelength tunable light source. Indicated by 1 is an optical spectrum analyzer, 2 is a control unit in the optical spectrum analyzer 1, 3 is a communication circuit for performing communication with external equipment, ② is an I/O terminal providing an interface with the communication circuit 3, 4 is a spectroscope which performs spectral resolving to extract a specified wavelength from the light to be measured and outputs the extracted wavelength, 5 is a light input terminal at which the light to be measured is input to the spectroscope 4, 6 is a motor for tuning the wavelength being extracted with the spectroscope 4, 7 is a drive circuit for driving the motor 6, 8 is a photodetector that receives the extracted light being output from the spectroscope 4 and which converts it to an electrical signal, 9 is an amplifier circuit for amplifying the small electrical signal being output from the photodetector 8, 10 is an A/D converter with which the analog signal being output from the amplifier circuit 9 is converted to a digital signal, 11 is a display unit for displaying the measured data, 12 is a position detector circuit for detecting the rotating position of the motor, 14 is a wavelength tunable light source, 15 is a control unit in the wavelength tunable light source 14, 16 is a communication circuit for performing communication with external equipment, ②' is an I/O terminal providing an interface with the communication circuit 16, 17 is a display unit for displaying conditions and the like, 18 is a light source drive circuit for driving a light source unit 20 and performing, for example, temperature control of the light source unit, 19 is a wavelength control circuit for controlling the wavelength being output from the light source unit, 20 is the light source unit that oscillates a single-mode spectrum and which is so adapted as to be capable of turning the oscillating wavelength, 21 is a light output terminal at which the optical signal being output from the light source unit 20 is output externally, and 22 is the device under measurement.

On the basis of motor control information preliminarily stored in the control unit 2, the optical spectrum analyzer 1 drives the motor 6 via the drive circuit 7 and sets the wavelength which is to be extracted by the spectroscope 4. The control unit 2 monitors and controls the position information being sent from the position detector circuit 12 coupled to the motor 6 and after confirming the setting of a specified wavelength, reads data from the A/D converter 10, performs arithmetic operations on the data and displays the result in the display unit 11. On the basis of a preset wavelength range and a preset number of measurements, the control unit 2 determines equally spaced wavelengths to be extracted with the spectroscope 4, intermittently determines data for the respective settings of extraction wavelength, and plots the data on the display unit 11 so that it is displayed as a single waveform.

On the basis of the light source drive information and wavelength information that are preliminarily stored in the control unit 15, the wavelength tunable light source 14 controls the light source drive circuit 18 and the wavelength control circuit 19 so as to tune the single-mode oscillating wavelength of the light source unit 20 and the optical power of its oscillation. The control unit 15 performs mathematical operations to determine relevant parameters from the settings of conditions displayed on the display unit 17 and controls the light source drive circuit 18 and the wavelength control circuit 19 so that the light source unit 20 is oscillated at the desired settings of conditions. The control unit 15 is also capable of intermittent tuning over a certain wavelength range at predetermined intervals.

The optical spectrum analyzer 1 functions as a host that controls the wavelength tunable light source 14 connected to external equipment. The control unit 2 in the optical spectrum analyzer 1 sends out a control instruction from the communication circuit 3 and the I/O terminal ② and supplies it to the control unit 15 in the wavelength tunable light source 14 via the I/O terminal ②' and the communication circuit 16, thereby setting the wavelength and optical power of signal light to be output from the wavelength tunable light source 14.

We now describe the prior art wavelength tracking system using an optical spectrum analyzer and a wavelength tunable light source by referring to FIG. 5, which is a flowchart for the sequence of steps in measurement by the prior art tracking system shown in FIG. 4.

First, the technician (the person who performs measurement) sets a plurality of conditions for measurement (e.g. $\lambda 0$ or the wavelength at which the measurement starts, $\lambda e$ or the wavelength at which the measurement ends, and the number of samples to be measured) in the spectrum analyzer 1, which then determines wavelength interval $\Delta\lambda$ and other parameters by arithmetic operations (this is step S1; in the following description, symbol S is used without being preceded by the word "step"). In accordance with the determined conditions, the control unit 2 sends a signal to the drive circuit 7, drives the motor 6 so that the wavelength to be extracted with the spectroscope 4 is set at the initial value, monitors the position information being output from the position detector circuit 12, and confirms the setting of the initial wavelength. The control unit 2 also sends out a command for shift to the initial wavelength and supplies it to the externally connected wavelength tunable light source 14 via the communication circuit 3 (S2).

By performing arithmetic operations from the command sent from the optical spectrum analyzer 1, the control unit 15 in the wavelength tunable light source 14 determines parameters to be imparted to the light source drive circuit 18 and the wavelength control circuit 19, sets the light source unit 20 at the initial wavelength and, after the end of the setting, sends a SETTING COMPLETE command to the control unit 2 in the optical spectrum analyzer 1 via the communication circuit 16 (S3). In response to a technician's instruction for starting measurement (S4), the control unit 2 in the optical spectrum analyzer 1 sends a control signal to the drive circuit 7 such that the wavelength $\lambda$ being extracted with the spectroscope 4 becomes equal to $\lambda 0$, drives the motor 6 while waiting for the end of its necessary motion while monitoring the position information being output from the position detector circuit 12. The control unit 2 also sends out a command for shift to $\lambda$, supplies it to the externally connected wavelength tunable light source 14 via the communication circuit 3 and waits for the return of a WAVELENGTH SETTING COMPLETE command from the wavelength tunable light source 14 (S5).

When wavelength setting has completed with the optical spectrum analyzer 1 and the wavelength tunable light source 14 (S6), the control unit 2 actuates the A/D converter 10 and picks up a digital signal (S7), as well as performs arithmetic operations to determine the value of optical power from factors such as preset conditions for the amplifier circuit 9 and plots the result on the display unit 11 (S8); the control unit 2 then performs an arithmetic operation to determine the next wavelength λ which is spaced from the wavelength of measurement by Δλ (S9) and performs another setting of the wavelength to be extracted with the spectroscope 4 and the wavelength to be output from the wavelength tunable light source 14. The control unit 2 continues these steps of wavelength setting and data measurement until λ exceeds λe (λ>λe) (S10), whereupon the measurement ends (S11).

If desired, the optical spectrum analyzer 1 and the wavelength tunable light source 14 may be controlled by other suitable means such as a separately provided computer.

According to the above-described prior art wavelength tracking system using an optical spectrum analyzer and a wavelength tunable light source, the optical spectrum analyzer I serving as a host controls the action of the wavelength tunable light source 14 via the communication interface and data measurement is performed as the wavelength being extracted with the spectroscope 4 and the output wavelength from the wavelength tunable light source 14 are set intermittently at predetermined intervals within the range of wavelengths to be measured and, what is more, commands are sequentially sent out through the communication interface. However, this is a very time-consuming procedure and much more time is required to measure an increased number of samples.

SUMMARY OF THE INVENTION

The present invention has been accomplished under these circumstances and has as an object providing an improved wavelength tracking system using an optical spectrum analyzer and a wavelength tunable light source, in which data being measured is sampled while performing high-speed sweep of a spectroscope in an optical spectrum analyzer and the wavelength of a wavelength tunable light source is swept in synchronism with the sweep of the spectroscope, thereby achieving high-speed wavelength tracking.

Another object of the invention is to provide a system capable of highly accurate wavelength tracking.

The first object of the invention can be attained by the wavelength tracking system which measures light wavelength characteristics using an optical spectrum analyzer that measures the spectra of optical signals and a wavelength tunable light source that can output light at different wavelengths, in which the timing of starting the rotation of a motor for controlling the drive of a spectroscope in said optical spectrum analyzer that extracts a specified wavelength by spectral resolving is allowed to coincide with the timing of starting the sweep of a single-mode oscillating wavelength from a light source unit in said wavelength tunable light source, and control is so performed as to attain wavelength coincidence within the range of measurement during continuous and high-speed sweep.

Very fast wavelength tracking can be accomplished by the system according to the second aspect of the invention and which is configured as shown in FIG. 1. The system comprises a drive circuit 7 which, in order to start sweeping an optical spectrum analyzer 1 and a wavelength tunable light source 14 on the same timing, controls a motor 6 for driving a spectroscope 4 and outputs a certain control signal on the timing where the motor 6 starts to rotate, and a wavelength control circuit 19 which controls the sweep of the wavelength of single-mode oscillation from the light source unit 20 and starts sweeping the light source unit 20 in response to a signal externally supplied to control the timing of sweep start. The system is so adapted that the sweep of the wavelength being measured with the optical spectrum analyzer 1 and that of the wavelength of single-mode oscillation from the wavelength tunable light source 14 are started on the same timing while achieving high-speed sweep.

The system according to the third aspect of the invention is also configured as shown in FIG. 1, except that sweep is started with the drive circuit 7 in the optical spectrum analyzer 1 being synchronized by the control signal being output from the wavelength control circuit 19 in the wavelength tunable light source 14 and control is so performed that the wavelength being extracted with the spectroscope 4 and the output wavelength of the light source unit 20 are brought into coincidence within the range of measurement during continuous and high-speed sweep.

The system according to the fourth aspect of the invention is configured as shown in FIG. 2. During high-speed sweep, the optical spectrum analyzer 1 relies upon a position detector circuit 12 connected to the motor 6 and a switching/delay circuit 28 to obtain the timing of sampling with the A/D converter 10 as well as the timing of allowing the resulting digital signal to be read by the control unit 2. For wavelength tracking of the optical spectrum analyzer 1 and the wavelength tunable light source 14, the system includes the wavelength control circuit 19 that generates a sampling timing correlated to the wavelength of single-mode oscillation from the wavelength tunable light source 14, an output terminal ②' and an input terminal ② for supplying the optical spectrum analyzer 1 with the control signal from the circuit 19, and a switching/delay circuit 13 which performs switching-based selection between the control signal generated from the position detector circuit 12 and the control signal outputted from the wavelength control circuit 19 and supplied to the optical spectrum analyzer 1 and which imparts a desired amount of delay to the selected control signal before it is supplied to the A/D converter 10. The system is so adapted that the sweep of the wavelength being measured with the optical spectrum analyzer 1 and that of the wavelength of single-mode oscillation from the wavelength tunable light source 14 are started on the same timing to achieve high-speed sweep.

The system according to the fifth aspect of the invention is so configured as shown in FIG. 3. The light source unit in the wavelength tunable light source 14 is composed of a diffraction grating 24 and a laser device 23 and by moving the diffraction grating 24 with a motor 25, the oscillating wavelength of the laser device 23 is tuned. The system further includes a drive circuit 26 that can start the motor 25 in response to a control signal that is output from the drive circuit 7 in the optical spectrum analyzer 1 to indicate the timing of sweep start and a position detector circuit 27 that is connected to the motor 25, detects its rotating position and supplies the detected position information to the switching/delay circuit 28 in the optical spectrum analyzer 1 via the output and input terminals ② and ②'. The system is so adapted that the sweep of the wavelength being measured with the optical spectrum analyzer 1 and that of the wavelength of single-mode oscillation from the wavelength tunable light source 14 are started on the same timing to achieve high-speed sweep.

According to the wavelength tracking systems using an optical spectrum analyzer and a wavelength tunable light source which are configured as shown in FIG. 1, the control unit 2 in the optical spectrum analyzer 1 determines various conditions for measurement by performing arithmetic operations on a preset range of wavelengths to be measured and a preset number of samples, and both the drive circuit 7 for the motor 6 that drives the spectroscope 4 and the position detector circuit 12 that actuates the A/D converter 10 at each wavelength of interest for sampling of data are set in their initial state. The conditions for measurement are transmitted to the control unit 15 in the wavelength tunable light source 14 via the communication circuit 3, whereupon the control unit 15 determines the conditions for controlling the light source unit 20 by performing arithmetic operations on the received conditions for measurement and initializes both the light source drive circuit 18 (for controlling the light source unit 20) and the wavelength control circuit 19, which are then set on standby.

In response to an instruction for starting measurement, the control unit 2 in the optical spectrum analyzer 1 actuates the drive circuit 7 to start the motor 6 so that a control signal for sweep start is output from the drive circuit 7. In synchronism with the control signal being output from the drive circuit 7, the wavelength control circuit 19 in the wavelength control light source 14 starts continuous sweep of the oscillating wavelength of the light source unit 20. The control units 2 and 15 have already performed arithmetic operations to determine those conditions for measurement by which the range of sweep per unit time of the wavelength being extracted with the spectroscope 4 becomes equal to the range of wavelength sweep per unit time of the single-mode signal light oscillated by the light source unit 20. Therefore, if synchronization for sweep start is effected with high precision, the wavelength being extracted with the spectroscope 4 and the oscillating wavelength of the light source unit 20 coincide and wavelength tracking can be performed at high speed without compromising the accuracy of wavelength measurement.

According to the wavelength tracking system using an optical spectrum analyzer and a wavelength tunable light source which is configured as shown in FIG. 2, the A/D converter 10 in the optical spectrum analyzer 1 samples data in response to a control signal that is output from the position detector circuit 12 at each point of data measurement and the control unit 2 picks up the sampled data and displays it on the display unit 11. In order to increase the accuracy of wavelength measurement with reference to the wavelength of the light source unit 20, position information for actuating the A/D converter 10 to effect data sampling is output from the wavelength control circuit 19 in the wavelength tunable light source 14, a control signal is supplied into the A/D converter 10 and the control unit 2 via dedicated input/output terminals and the switching/delay circuit 28, data is sampled in response to the control signal that is output at each point of data measurement, and the sampled data is picked up by the control unit 2.

In the wavelength tracking system using an optical spectrum analyzer and a wavelength tunable light source which is configured as shown in FIG. 3, the light source unit in the wavelength tunable light source 14 consists of the laser device 23 and the diffraction grating 24 which acts as a wavelength filter and the drive circuit 26 that controls the motor 25 for rotating the diffraction grating 24 is supplied with a sweep start signal from the drive circuit 7 in the optical spectrum analyzer 1. In addition, position information for actuating the A/D converter 10 to effect data sampling is output from the position detector circuit 27 connected to the motor 25, a control signal is supplied into the A/D converter 10 and the control unit 2 via dedicated input/output terminals and the switching/delay circuit 28, data is sampled in response to the control signal that is output at each point of data measurement, and the sampled data is picked up by the control unit 2.

DETAILED DESCRIPTION OF THE PREFERRED EMBODIMENTS

Figure 1:
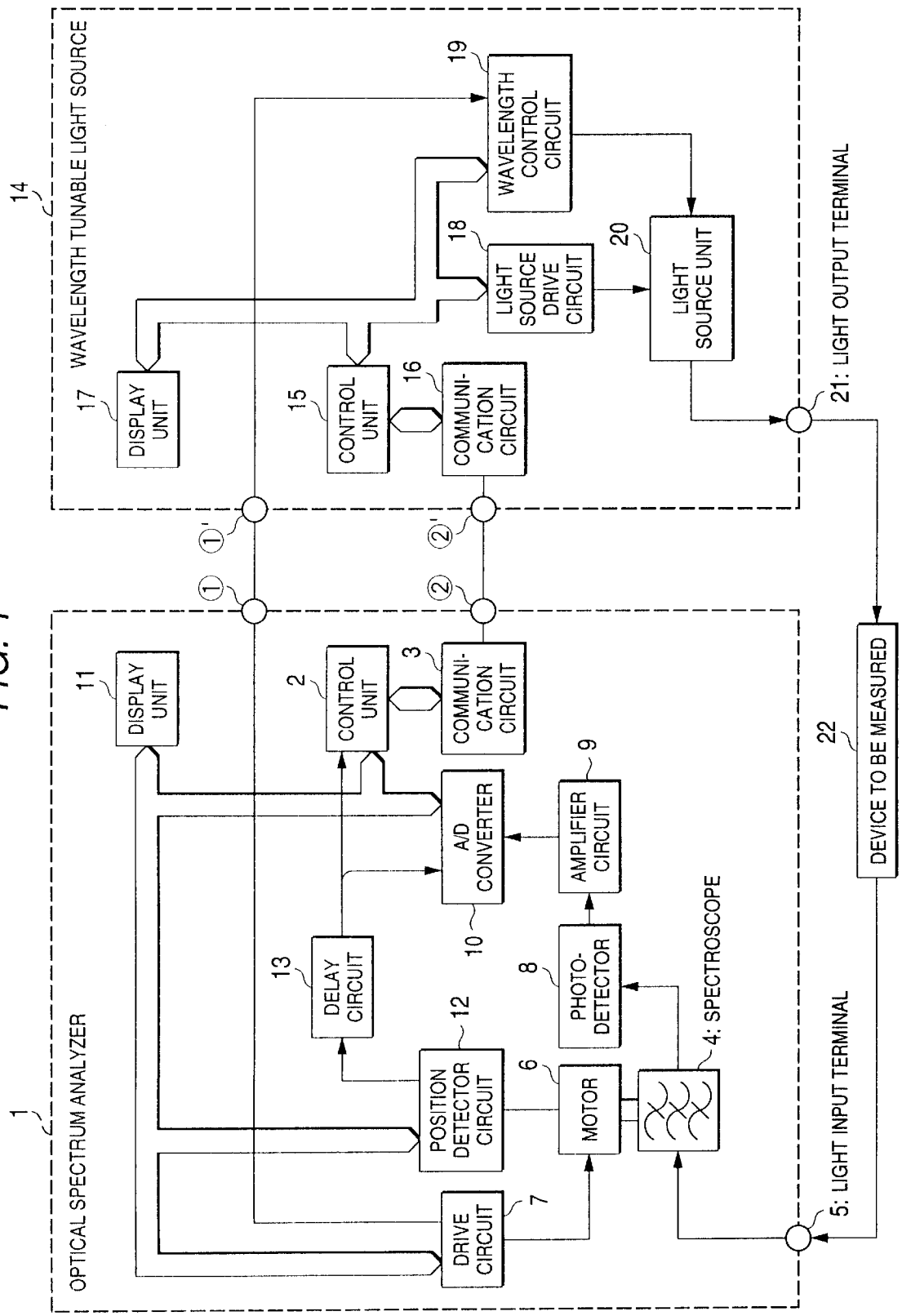
FIG. 1 is a block diagram showing the configuration of a wavelength tracking system using an optical spectrum analyzer and a wavelength tunable light source according to the first and second embodiments of the invention.

Several embodiments of the invention are described below in detail with reference to FIGS. 1–3. FIG. 1 is a block diagram showing the configuration of a wavelength tracking system using an optical spectrum analyzer and a wavelength tunable light source according to the first and second embodiments of the invention. In this figure, reference numeral 1 represents an optical spectrum analyzer which comprises a control unit 2 for controlling all blocks in the analyzer, a communication circuit 3 for performing communication with externally connected equipment in accordance with a predetermined protocol, a spectroscope 4 which performs spectral resolving to extract a specified wavelength from the light to be measured and outputs the extracted wavelength, a light input terminal 5 at which the light to be measured is input to the spectroscope 4, a motor 6 for tuning the wavelength being extracted with the spectroscope 4, a drive circuit 7 for driving the motor 6 and supplying a control signal to external equipment, a photodetector 8 that receives the extracted light being output from the spectroscope 4 and which converts it to an electrical signal, an amplifier circuit 9 for amplifying the small electrical signal being output from the photodetector 8, an A/D converter 10 with which the analog signal being output from the amplifier circuit 9 is converted to a digital signal, a display unit 11 for displaying the measured data, a position detector circuit 12 for detecting the rotating position of the motor, and a delay circuit 13 which, on the basis of the detected position information, adjusts the delay time of a signal for supplying information that actuates the A/D converter 10 and which allows the control unit 2 to acquire a digital signal. Numeral ① represents an output terminal from the optical spectrum analyzer 1 at which the control signal being output from the drive circuit 7 is supplied externally, ①' is an input terminal at which a control signal for sweep start is input to the wavelength control circuit 19, and ②  and ②' are an input and an output terminal for communication circuits.

In the optical spectrum analyzer 1, the optical signal extracted with the internally provided spectroscope 4 is converted to an electrical signal by means of the photodetector 8 and the amplifier circuit 9; the electrical signal is sampled with the A/D converter 10 and the control unit 2 performs arithmetic operations on the measured data and displays the result on the display unit 11. The wavelength being extracted with the spectroscope 4 can be tuned by rotating the internal diffraction grating with the motor 6. The control unit 2 determines the amount of rotation of the motor 6 by arithmetic operations so that the amount of rotation of the diffraction grating during sweep measurement falls within a preset range of wavelengths to be measured; at the same time, the rotating speed of the motor 6 is determined by arithmetic operations; on the basis of the thus determined conditions, the drive circuit 7 controls the rotating speed of the motor and the amount of its rotation.

The spectroscope 4 may be of a single pass type or a double pass type. It may be of Retreau arrangement or Zerni-Turner arrangement. In response to an instruction for motor start from the control unit 2, the drive circuit 7 starts to rotate the motor 6 at a preset speed until a given amount of rotation is reached. When starting the motor 6 in response to an instruction for motor start from the control unit 2, the drive circuit 7 simultaneously outputs an external control pulse signal (i.e., the pulse signal is output on the same timing as the start of motor rotation) so that information to start sweeping is imparted to external equipment via the output terminal ① for control signal that is provided in the optical spectrum analyzer 1. Depending on which equipment is connected externally, a certain amount of delay occurs before the equipment starts to be controlled in response to the control signal; to deal with this situation, the drive circuit 7 has such a capability that the timing on which the control pulse signal is output is advanced or delayed by a desired amount with respect to the timing on which the motor 6 starts to rotate.

The position detector circuit 12 is connected to the motor 6 for accurately determining the amount of rotation of the motor and its rotating position. The position detector circuit 12 is typically composed of a rotation sensor such as an encoder that outputs pulses as the motor 6 rotates, a counter, a latch for holding the data imparted by the control unit 2 that indicates the rotating position to be finally reached, and a comparator for comparing the latched data with the counts obtained by the counter. Of course, the position detector circuit 12 may be composed in any other suitable manner. When the drive circuit 7 starts to rotate the motor 6, the encoder in the connected position detector circuit 12 also starts to rotate and outputs a pulse at each predetermined angle. The pulses are counted with the counter and output as data, which provides information about the wavelength to be extracted with the spectroscope 4 which is determined by the amount of rotation of the motor 6, or the rotating angle of the diffraction grating.

The latch in the position detector circuit 12 has target position data set by the control unit 2 which is associated with the wavelength at which the A/D converter 10 is actuated and data is sampled. If the motor 6 for driving the spectroscope 4 is a pulsed motor such as a stepping motor, the pulses for driving the motor 6 rather than the pulses output from the encoder connected to the motor 6 may be counted directly. The output from the counter and the target position data held in the latch are connected to the comparator and the two data are always compared with each other. If the target position data coincides with the output of the counter, a trigger pulse to actuate the A/D converter 10 is output.

The output trigger pulse is supplied to the control unit 2 and the A/D converter 10 via the delay circuit 13, whereupon the A/D converter 10 is actuated to start data sampling while, at the same time, it provides the control unit 2 with the timing on which it reads the digital data produced by conversion and sampling with the A/D converter 10. The delay circuit 13 adjusts the timing on which the A/D converter 10 samples data. In response to the input of the trigger pulse and the state of the A/D converter 10, the control unit 2 reads the sampled and output digital data and performs the necessary arithmetic operations on it; at the same time, the control unit 2 clears the data held in the latch in the position detector circuit 12 and causes it to hold the next target pulse.

The interval between target pulses to be set is determined by a preset wavelength range and a preset number of samples to be measured. By adopting the procedure described above, data can be sampled continuously without stopping the motor 6 and, hence, high-speed sweep can be accomplished in wavelength tracking. To measure the spectrum of the light of interest, the same procedure may be followed up to the wavelength for end of measurement.

A wavelength tunable light source indicated by 14 in FIG. 1 has two capabilities; the oscillating wavelength of a single-mode optical signal from an internal light source unit 20 can not only be set to a desired value in a light source drive circuit 18 and a wavelength control circuit 19; it can also be swept continuously over a certain wavelength range. The wavelength tunable light source 14 also has a communication circuit 16 for having communication with externally connected equipment in accordance with a predetermined protocol. Single-mode signal light that is output from the light source unit 20 is supplied externally via a light output terminal 21 and connected to a device 22 whose wavelength characteristics are to be measured by the wavelength tracking system of the invention.

The wavelength tunable light source 14 has a control unit 15 that controls the light source drive circuit 18 and the wavelength control circuit 19 in accordance with the controlling conditions that have been determined by arithmetic operations from preset conditions such as light output wavelength/intensity. The light source is generally composed of a semiconductor laser device but an optical fiber doped with a rare earth element may be substituted. Typical but by no means limiting examples include a DBR semiconductor laser that electrically controls a special filter provided within a semiconductor laser device and an external resonator type semiconductor laser that controls wavelength using a laser device in combination with a narrowband optical BPF or a diffraction grating. The light source drive circuit 18 has a capability for controlling the bias current for oscillating the light source unit 20 and its temperature.

The wavelength control circuit 19 has a capability for not only setting a desired range of wavelengths at which a single-mode optical signal is output from the light source unit 20 but also sweeping the wavelength continuously over the set range. Thus, the wavelength control circuit 19 provides a control method that fits the wavelength setting means provided in the light source unit 20. The wavelength tunable light source 14 has an input terminal ①' for control signal and when sweeping the wavelength, the wavelength control circuit 19 can start sweeping in response to a control pulse signal supplied at said input terminal. In the present invention, the drive circuit 7 in the optical spectrum analyzer 1 outputs a control pulse signal in synchronism with the start of motor 6, whereupon the wavelength control circuit 19 starts to sweep the wavelength of the signal light being output from the light source unit 20. The range and speed of the wavelength sweep that are performed are preliminarily determined with the control unit 2 by arithmetic operations in such a way that they are equal to the range of wavelengths to be extracted with the spectroscope 4 in the optical spectrum analyzer 1 and the sweep speed.

In the first embodiment of the invention described above, the range of sweeping wavelength and the sweep speed, as well as various conditions determined from the number of samples to be measured are preliminarily determined by communication between the optical spectrum analyzer 1, especially the control unit 2 and the communication circuit 3, and the wavelength tunable light source 14, especially the control unit 15 and the communication circuit 16. When sweeping starts, in synchronism with a control pulse signal that is output from the drive circuit 7, the wavelength control circuit 19 starts sweeping the wavelength of the light source unit 20 simultaneously with the sweep of extracted wavelength from the spectroscope 4, thereby performing wavelength tracking. In response to a sampling trigger pulse that is output from the position detector circuit 12, the A/D converter 10 samples data, the control unit 2 performs arithmetic operations on the converted data and the result is displayed on the display unit 11. In this way, wavelength tracking can be performed at high speed using the optical spectrum analyzer 1 and the wavelength tunable light source 14.

We next describe the second embodiment of the invention with reference to FIG. 1. The second embodiment is essentially the same as the first embodiment, except that in response to an instruction for sweep start that is input to the optical spectrum analyzer 1, the control unit 2 sends a SWEEP START command to the control unit 15 in the wavelength tunable light source 14 via the communication circuits 3 and 16. Receiving the command, the control unit 15 actuates the wavelength control circuit 19 and starts sweeping the single-mode oscillating wavelength output from the light source 20 over a preset wavelength range at a preset sweep speed. Simultaneously with the start of sweeping, the control unit 1 may output a control pulse signal which is output externally via the dedicated output terminal ①'. A control pulse signal may also be supplied to the control circuit 7 in the optical spectrum analyzer 1 via the input terminal ① and in synchronism with this pulse, the control circuit 7 starts the motor 6 for driving the spectroscope 4.

Since the speed of sweeping the extracted wavelength from the spectroscope 4 is set to be equal to the speed of sweeping the wavelength of the light source unit 20, the sweeping of the two wavelengths can be started in synchronism in response to the control pulse signal that is output from the wavelength control circuit 19.

Figure 2:
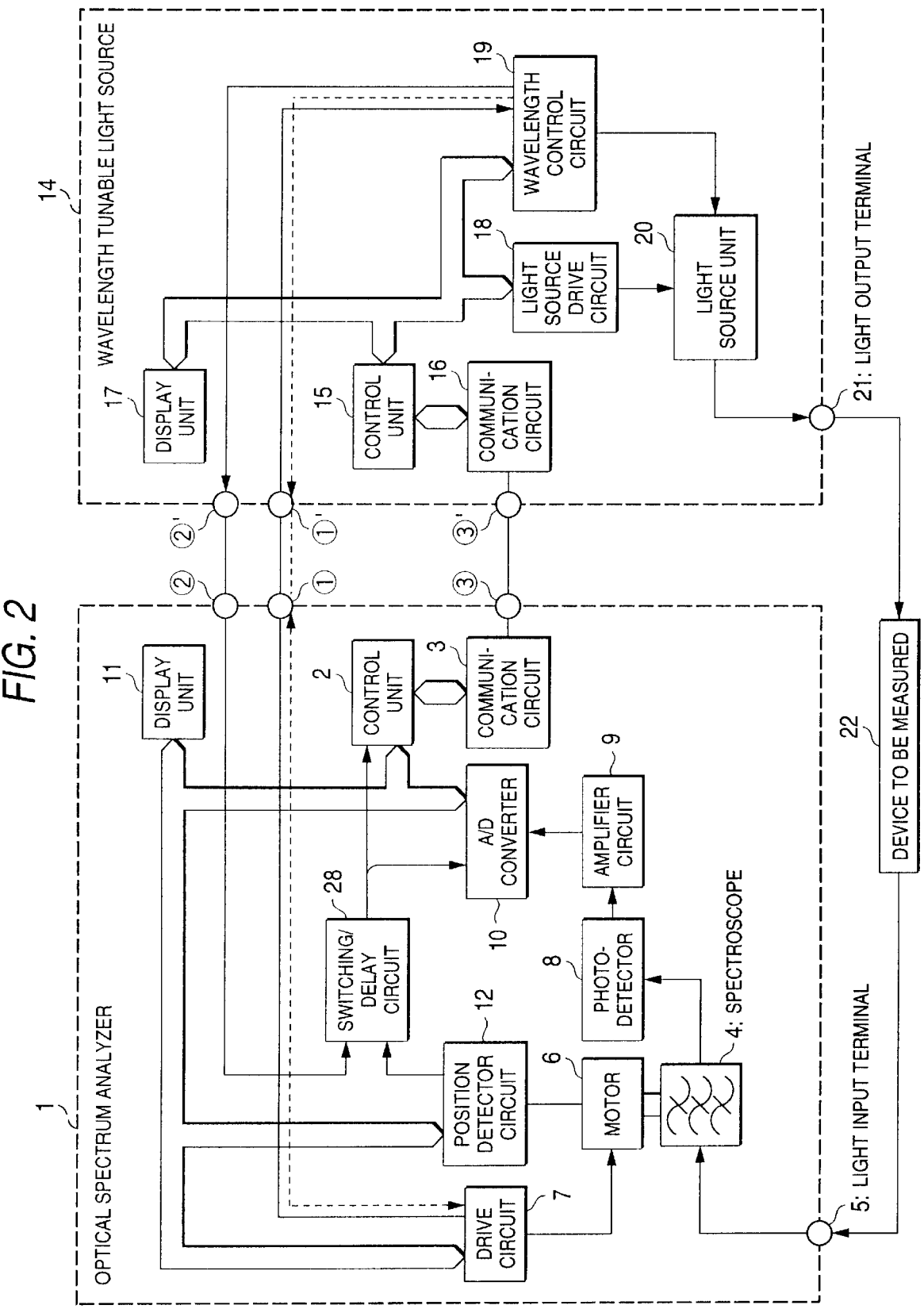
FIG. 2 is a block diagram showing the configuration of a wavelength tracking system using an optical spectrum analyzer and a wavelength tunable light source according to the third embodiment of the invention.

Next, we describe the third embodiment of the invention with reference to FIG. 2, which is a block diagram showing the configuration of a wavelength tracking system using an optical spectrum analyzer and a wavelength tunable light source according to the third embodiment of the invention. In FIG. 2, the parts which are identical to those shown in FIG. 1 are identified by like numerals and are not described in detail.

Reference numeral ③ represents an input terminal at which a trigger signal is input externally to actuate the A/D converter 10 in the optical spectrum analyzer 1 for sampling data; ③' is an output terminal for externally supplying a pulse signal that is output at each of the preset wavelengths from the wavelength control circuit 19 in the wavelength tunable light source 14; and 28 is a switching/delay circuit that selects between a trigger signal that is output from the position detector circuit 12 in the optical spectrum analyzer 1 and an external trigger signal entered at the input terminal ②; the circuit 28 also has the ability to delay the selected trigger signal by a desired amount.

The third embodiment of the invention has basically the same function as the first embodiment, except that the switching/delay circuit 28 provided in the optical spectrum analyzer 1 selects between a trigger signal that provides a sampling timing related to the wavelength extracted with the spectroscope 4 and output from the position detector circuit 12 and a trigger signal that is input from external equipment at the input terminal ③. In response to the selected trigger signal, the A/D converter 10 is actuated to sample data. The wavelength control circuit 19 provided in the wavelength tunable light source 14 can start sweeping the wavelength of the light source 20 in response to an externally supplied control pulse signal; after starting sweeping, the wavelength control circuit 19 outputs a pulse at each of the wavelengths the control unit 15 has determined by arithmetic operations and supplies the output pulse externally of the wavelength tunable light source 14 via the output terminal ③'.

In the third embodiment, the input terminal ③ of the optical spectrum analyzer 1 is connected to the output terminal ③' of the wavelength tunable light source 14 and the pulse signal that is output from the wavelength control circuit 19 is input to the switching/delay circuit 28 so as to actuate the A/D converter 10 for sampling measured data, which is then read by the control unit 2.

Depending on the method of tuning the wavelength of the light source unit 20, various techniques may be used to generate a trigger signal from the wavelength control circuit 19. If a voltage is to be applied to vary the output wavelength of the light source 20, digital data obtained by converting the applied voltage with, for example, an A/D converter is compared by, for example, a digital comparator with data associated with the wavelength preset by the control unit 2 and a pulse is output if the two data coincide. Alternatively, a voltage associated with the intended wavelength is set by, for example, a D/A converter and compared with the applied voltage by, for example, an analog comparator and a pulse is output if the two voltages coincide. If a pulse is to be applied to vary the wavelength of the light source unit 20, the pulses being applied to the light source unit 20 are counted by, for example, a counter and the result is compared by, for example, a comparator with data that is associated with the intended wavelength predetermined by the control unit 15 and a pulse is output if the two data coincide. If another method is used to vary the output wavelength of the light source unit 20, a suitable technique may be employed to output pulses.

In the third embodiment, the wavelength control circuit 19 outputs a trigger signal with reference to the wavelength being output from the light source unit 20 and the trigger actuates the A/D converter 10; this contributes to increase the accuracy of measuring data during wavelength tracking.

To synchronize the sweeping of the spectroscope 4 with that of the light source unit 20, the control signal that is output from the drive circuit 7 may be input to the wavelength control circuit or, alternatively, the control signal that is output from the wavelength control signal 19 may be input to the drive circuit 7; either method is applicable in the third embodiment of the invention.

Figure 3:
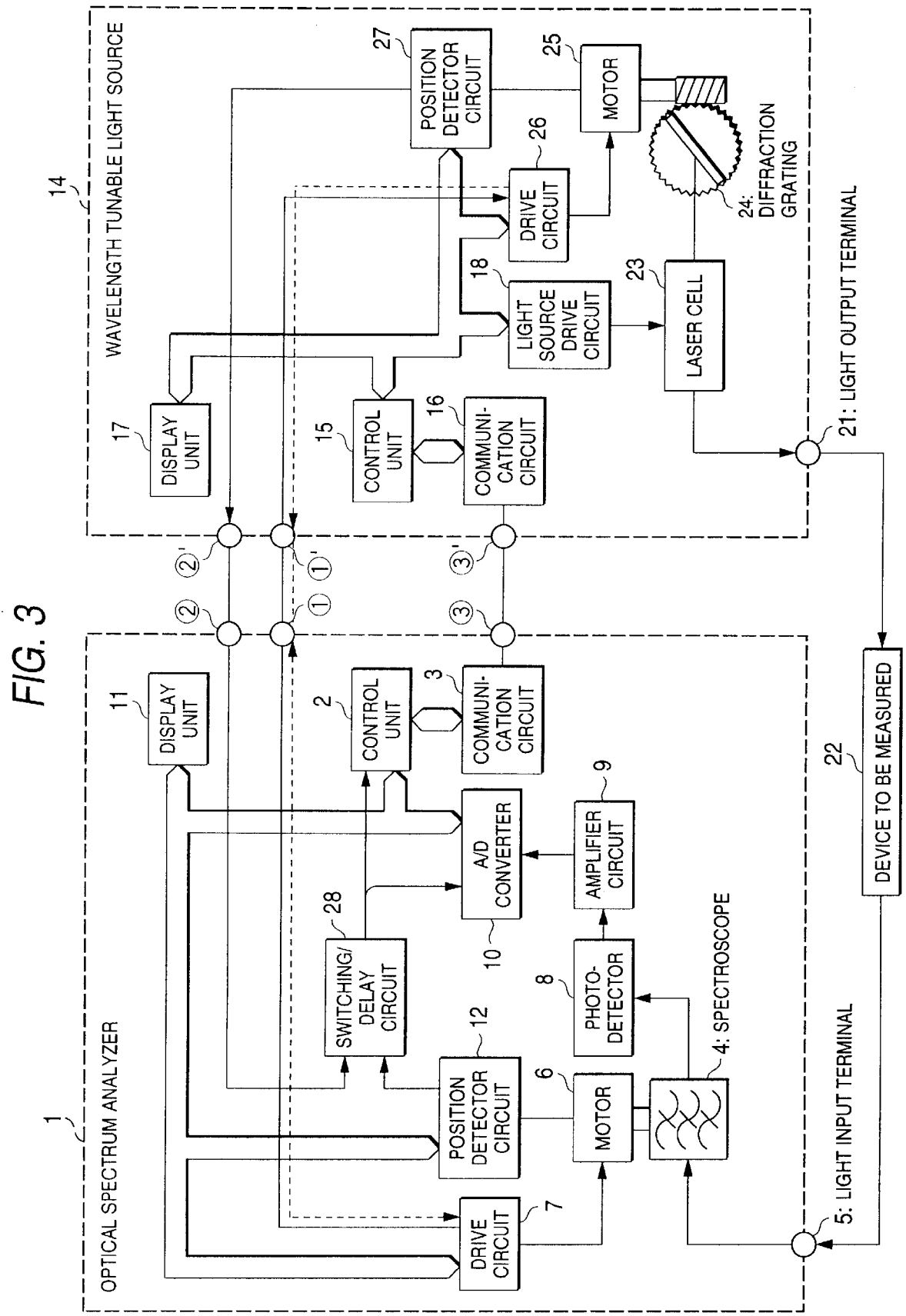
FIG. 3 is a block diagram showing the configuration of a wavelength tracking system using an optical spectrum analyzer and a wavelength tunable light source according to the fourth embodiment of the invention.

We next describe the fourth embodiment of the invention with reference to FIG. 3, which is a block diagram showing the configuration of a wavelength tracking system using an optical spectrum analyzer and a wavelength tunable light source according to the fourth embodiment of the invention. In FIG. 3, the parts which are identical to those shown in FIG. 1 are identified by like numerals and are not described in detail.

In FIG. 3, reference numeral 23 represents a laser device serving as a light source unit, 24 is a diffraction grating that applies a feedback of a specified wavelength to the laser device 23 to select a single wavelength, 25 is a motor for rotating or causing angular changes in the diffraction grating 24, 26 is a drive circuit for controlling the motor 25, and 27 is a position detector circuit connected to the motor 25 for detecting the amount of its rotation.

To control single-mode oscillating wavelengths, many types of the wavelength tunable light source 14 available today use the laser device 23 in combination with a wavelength selecting means such as diffraction grating 24 or optical BPF and spontaneous emission of light that is output from the laser device 23 is sliced by the wavelength selecting means and fed back to the laser device 23. Various methods may be used to vary the angle of the wavelength selecting means and all of them are applicable.

The wavelength of the single-mode optical signal that is oscillated by the laser device 23 in the wavelength tunable light source 14 can be changed by varying the angle of the diffraction grating 24. Since the angle of the diffraction grating 24 is freely adjustable by controlling the amount of rotation of the motor 25, the oscillating wavelength is correlated to the amount of motor rotation. The control unit 15 determines the amount of rotation of the motor 25 and its speed by arithmetic operations on preset conditions such as the range of oscillating wavelengths and sets the drive circuit 26 accordingly.

The drive circuit 26 can not only output a pulsed synchronizing control signal on the same timing as it starts to actuate the motor 25; it can also start the motor 25 in response to an externally applied, pulsed synchronizing control signal.

The position detector circuit 27 connected to the motor 25 is made of the same components as the position detector circuit 12 in the optical spectrum analyzer 1, i.e., a rotation sensor such as an encoder that outputs pulses as the motor rotates, a counter, a latch for holding the data imparted by the control unit 15 that indicates the rotating position to be finally reached, and a comparator that compares the latched data with the counts obtained by the counter. Of course, other configurations may be adopted.

The control unit 2 in the optical spectrum analyzer 1 and the control unit 15 in the wavelength tunable light source 14 set sweep conditions in the drive circuits 7 and 26, respectivly. When an instruction for sweep start is given, these control units are synchronized in response to control signals from the drive circuits 7 and 26 and start motors 6 and 25. The amount of rotation of the motor 6 connected to the spectroscope 4 and its rotational speed, as well as the amount of rotation of the motor 25 which varies the angle of the diffraction grating 24 and its rotational speed are controlled in such a way that the wavelength being extracted with the spectroscope 4 is in complete agreement with the oscillating wavelength of the laser device 23.

The position detector circuit 27 connected to the motor 25 outputs a pulsed trigger signal at each of the wavelengths imparted by the control unit 15 and the output trigger signal is supplied to the switching/delay circuit 28 via the output terminal ③' and the input terminal ③; after being delayed for the desired time that has been designated by the control unit 2, the trigger signal is input to the A/D converter 10, which is then actuated to sample measured data. The control unit 2 also monitors the trigger signal and the state of the A/D converter 10, picks up the digital data obtained by A/D conversion, performs arithmetic operations on the digital data and displays the result on the display unit 11.

The fourth embodiment is similar to the first embodiment in that wavelength tuning can be accomplished without stopping the motor 6 for driving the spectroscope 4 and the motor 25 for varying the angle of the diffraction grating 24 which controls the oscillating wavelength of the laser device 23. In addition, two sweeps can be initiated on the same timing in response to a synchronizing control signal. As a result, wavelength tracking can be performed at high speed using the optical spectrum analyzer 1 and the wavelength tunable light source 14.

Figure 4:
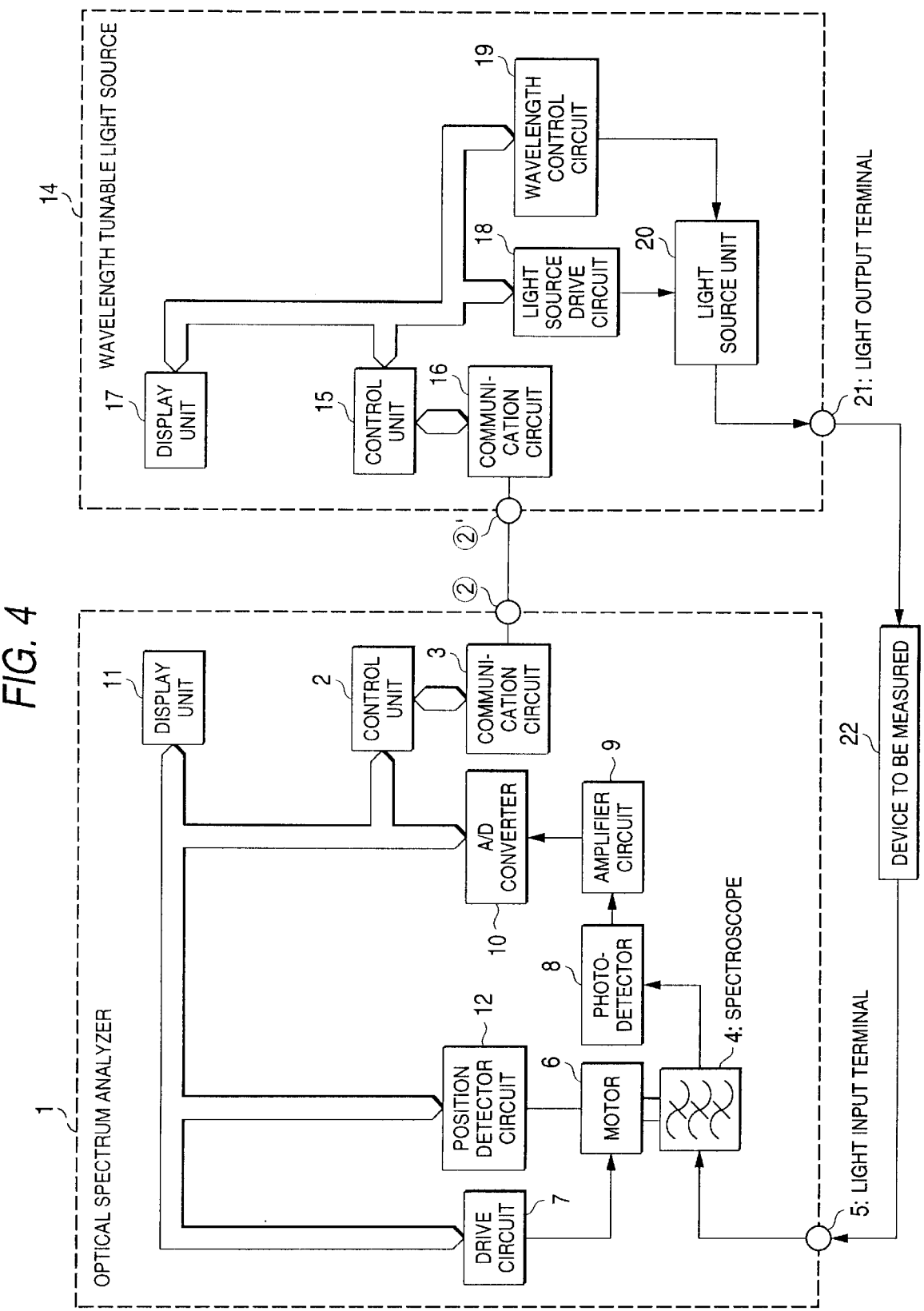
FIG. 4 is a block diagram showing the configuration of a prior art wavelength tracking system using an optical spectrum analyzer and a wavelength tunable light source.
Figure 5:
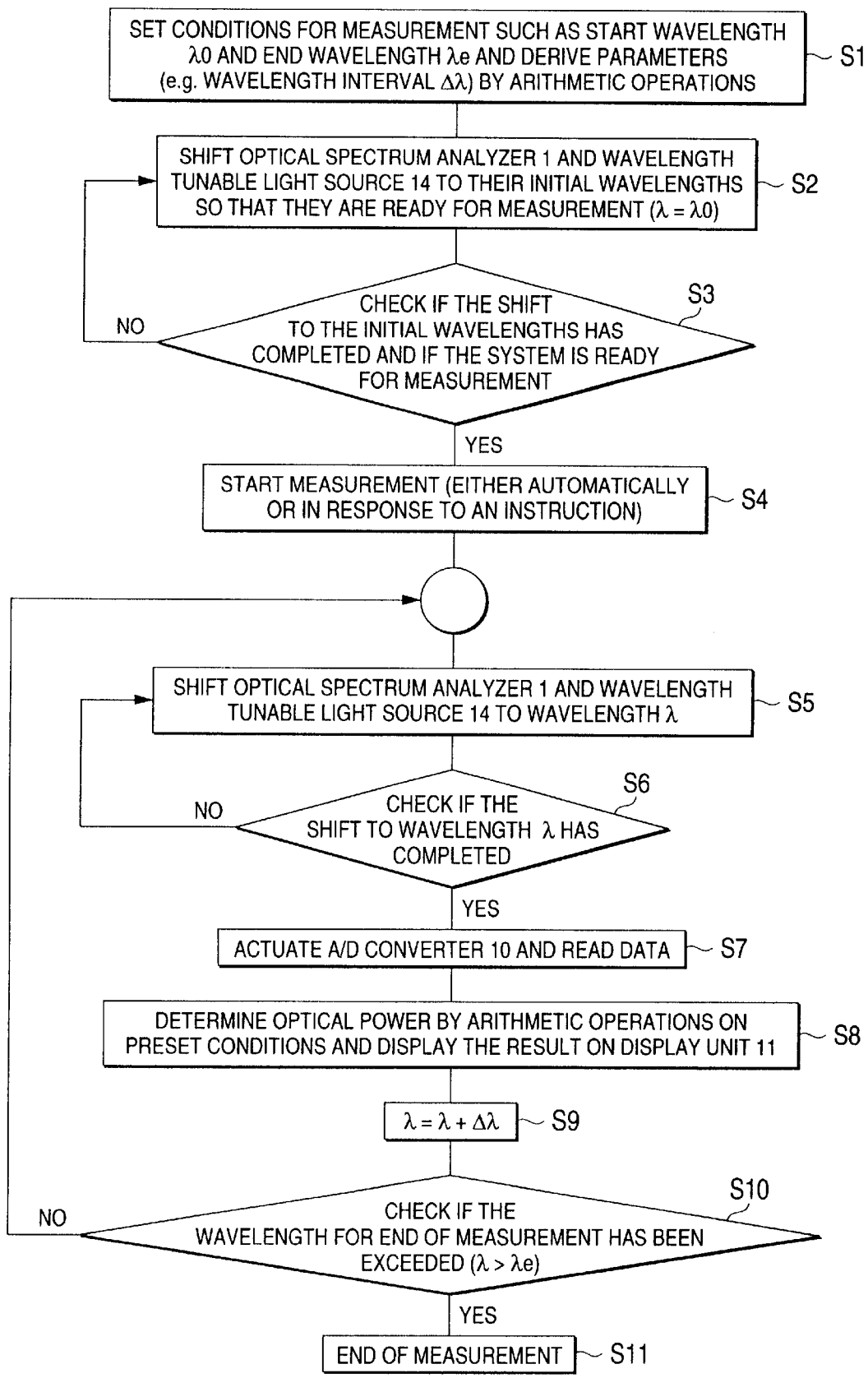
FIG. 5 is a flowchart for the sequence of steps in measurement by the prior art tracking system shown in FIG. 4.

The foregoing embodiments are intended for illustrative purposes only and are by no means limiting the present invention, of which various modifications can be made without departing from its scope. For example, in all of the four embodiments described above, the prior art wavelength tracking system using an optical spectrum analyzer and a wavelength tunable light source as shown in FIGS. 4 and 5 can be realized for application to a special case such as where averaging or some other suitable technique is performed for each wavelength with a view to providing enhanced sensitivity. In the foregoing description, the optical spectrum analyzer 1 is a host in wavelength tracking and controls the wavelength tunable light source 14; alternatively, the wavelength tunable light source 14 may be a host that controls the optical spectrum analyzer 1. The communication circuits 3 and 16 may be a common interface such as GPIB or RS232C or they may be other interfaces such as TCP/IP.

As described on the foregoing pages, the present invention allows for sampling of measured data as the spectroscope in an optical spectrum analyzer is swept at high speed. Therefore, by sweeping the wavelength of a wavelength tunable light source at a speed comparable to the sweep speed of the spectroscope, high-speed wavelength tracking can be accomplished using the optical spectrum analyzer and the wavelength tunable light source.

In a preferred embodiment, data from the optical spectrum analyzer can be sampled with reference to the output wavelength from the wavelength tunable light source and, hence, highly accurate wavelength tracking can be accomplished using the optical spectrum analyzer and the wavelength tunable light source.

Using the invention, loss vs. wavelength characteristics as in fiber gratings, dielectric multi-layered filters and optical components for WDM can be measured over a very broad optical dynamic range with high accuracy of wavelength at high speed.

What is more, during testing of optical components just after their production, prior to use after delivery and after aging, measurements can be accomplished over a broad optical dynamic range with high accuracy of wavelength at high speed.

What is claimed is:

1. A wavelength tracking system comprising:
    an optical spectrum analyzer to measure spectra of optical signals, the optical spectrum analyzer including a spectroscope to extract a specified wavelength by spectral resolving and a motor to control a drive of the spectroscope; and a wavelength tunable light source coupled to the optical spectrum analyzer to measure light wavelength characteristics from the optical spectrum analyzer, the wavelength tunable light source including a light source unit that can output light at different wavelengths; and wherein the timing of starting rotation of the motor coincides with the timing of starting a sweep of a single-mode oscillating wavelength from the light source unit to attain wavelength coincidence within the range of measurement during continuous and high-speed sweep.

2. The wavelength tracking system according to claim 1, wherein said optical spectrum analyzer comprises:

a control unit for controlling the elements of said optical spectrum analyzer;

a communication circuit for performing communication with external equipment and an input and an output terminal for said communication circuit;

a spectroscope that performs spectral resolving to extract a specified wavelength from the light to be measured and which outputs the extracted wavelength;

a light input terminal at which the light to be measured is input to said spectroscope;

a motor for tuning the wavelength to be extracted by said spectroscope;

a drive circuit for driving said motor and supplying a control signal to external equipment;

a photodetector that receives the extracted light being output from said spectroscope and which converts it into an electrical signal;

an amplifier circuit for amplifying the electrical signal being output from said photodetector;

an A/D converter with which an analog signal being output from said amplifier circuit is converted into a digital signal;

a display unit for displaying the data measured on the device under measurement;

a position detector circuit for detecting the rotating position of said motor;

a delay circuit which, on the basis of the detected position information, adjusts the delay time of a signal for supplying information that actuates said A/D converter and which allows said control unit to acquire a digital signal; and an output terminal at which a motor drive control signal being output from said drive circuit is supplied externally; and said optical spectrum analyzer being so adapted to perform continuous and high-speed sweep of the wavelength to be measured and supply a sweep start signal and other conditions to external equipment;

wherein said wavelength tunable light source comprises:

a control unit for controlling the elements of said wavelength tunable light source;

a communication circuit for performing communication with external equipment and an input and an output terminal for said communication circuit;

a display unit for displaying conditions for measurement;

a light source drive circuit for driving a light source unit and performing temperature control of said light source unit;

a wavelength control circuit for controlling the wavelength being output from said light source unit;

said light source unit being so adapted that it oscillates a single-mode spectrum and the oscillation wavelength can be tuned; and a light output terminal at which the optical signal being output from said light source unit is output externally;

said wavelength tunable light source being so adapted that the output wavelength can be swept continuously at high speed and that sweep can be started in response to an external control signal; and wherein sweep is started with said wavelength control circuit being synchronized by the control signal being output from said drive circuit and control is so performed that the wavelength being extracted with said optical spectrum analyzer and the wavelength of the single-mode light being output from said wavelength tunable light source are brought into coincidence within the range of measurement during continuous and high-speed sweep.

3. The wavelength tracking system according to claim 2, wherein sweep is started with the drive circuit in said optical spectrum analyzer being synchronized by the control signal being output from said wavelength control circuit in said wavelength tunable light source and control is so performed that the wavelength being extracted with said spectroscope and the output wavelength of said light source unit are brought into coincidence within the range of measurement during continuous and high-speed sweep.

4. The wavelength tracking system according to claim 2, wherein said optical spectrum analyzer further includes:

a switching/delay circuit which not only performs switching between the motor position information being output from said position detector circuit and an external circuit but also has a delaying function; and an input terminal at which position information is input externally;

wherein said wavelength tunable light source has an output terminal at which the wavelength information being output from said wavelength control circuit is output externally; and wherein the information for actuating said A/D converter and the information for allowing the control unit in said optical spectrum analyzer to acquire the resulting digital signal are selected by said switching/delay circuit from the position detector circuit in said optical spectrum analyzer and a position detector circuit in said wavelength tunable light source and control is so performed as to attain wavelength coincidence within the range of measurement during continuous and high-speed sweep.

5. The wavelength tracking system according to claim 4, wherein said wavelength tunable light source further includes:

a diffraction grating and a laser device which, in combination, provide a light source unit;

a motor for rotating said diffraction grating;

a drive circuit for driving said motor;

a position detector circuit for detecting the rotating position of said motor; and an output terminal at which the position information about said motor is output externally; and wherein the information for actuating said A/D converter and the information for allowing the control unit in said optical spectrum analyzer to acquire the resulting digital signal are selected by said switching/delay circuit from the position detector circuit in said optical spectrum analyzer and the position detector circuit in said wavelength tunable light source and control is so performed as to attain wavelength coincidence within the range of measurement during continuous and high-speed sweep.

6. A wavelength tracking system comprising: an optical spectrum analyzer including:
   a spectroscope to extract a signal of a particular wavelength from an optical signal from an external device;
   a motor coupled to the spectroscope to tune the spectroscope to the particular wavelength; and
   a first drive circuit coupled to the motor to drive the motor; and
   a wavelength tunable light source including:
      a light source to provide a single-mode oscillating wavelength optical signal to the external device;
      a second drive circuit coupled to the light source to drive the light source; and
      a control circuit coupled to the light source to control a wavelength of the optical signal provided by the light source,
   wherein the first drive circuit is coupled to the control circuit to provide a control signal between the first drive circuit and the control circuit, the control signal for synchronizing the first drive circuit and the control circuit to cause the motor to start rotating at substantially the same time as the light source starts to sweep the single-mode oscillating optical signal.

7. The system of claim 6 wherein the first drive circuit is configured to provide the control signal to the control circuit.

8. The system of claim 6 wherein the control circuit is configured to provide the control signal to the first drive circuit.

9. The system of claim 6 wherein the optical spectrum analyzer further comprises:
   circuitry coupled to an output of the spectroscope to receive the optical signal extracted by the spectroscope and to provide an electrical signal corresponding to an optical signal detected by the output of the spectroscope;
   a control unit to receive the electrical signal from said circuitry and to provide control signals to other components of the optical spectrum analyzer;
   a position detector circuit coupled to the motor to detect a position of the motor; and
   a delay circuit coupled to an output of the position detector circuit and coupled to respective inputs of said circuitry and the control unit, the delay circuit for providing a delay signal to said circuitry based on an output signal from the position detector circuit, said delay signal to adjust a time at which said circuitry samples data corresponding to the optical signal from the spectroscope.

10. The system of claim 6 wherein the optical spectrum analyzer further comprises:
   circuitry coupled to an output of the spectroscope to receive the optical signal extracted by the spectroscope and to provide an electrical signal corresponding to an optical signal detected by the output of the spectroscope;
   a control unit to receive the electrical signal from said circuitry and to provide control signals to other components of the optical spectrum analyzer;
   a position detector circuit coupled to the motor to detect a position of the motor; and
   a switching circuit coupled to an output of the position detector circuit and an output of the control circuit and coupled to respective inputs of said circuitry and the control unit, the switching circuit for selecting as its input either the output of the position detector circuit or the output of the control circuit, and the switching circuit for providing a delay signal to said circuitry based on the selected output, said delay signal to adjust a time at which said circuitry samples data corresponding to the optical signal from the spectroscope.

11. The system of claim 10 wherein the control circuit comprises:
   a diffraction grating including an output coupled to the light source;
   a second motor coupled to the diffraction grating to control rotation of the diffraction grating;
   a third drive circuit coupled to the second motor to drive the second motor; and
   a second position detector circuit coupled to the second motor to detect a position of the second motor.

12. The system of claim 11 wherein the light source includes a laser cell.

13. The system of claim 6 wherein the optical signal from the light source can be swept continuously at high speed in coincidence with extraction of the particular wavelength by the spectroscope.

14. A method comprising:
   tuning a spectroscope to a particular wavelength using a motor;
   causing the motor to start rotating at substantially the same time as a light source starts to sweep a single-mode oscillating optical signal;
   extracting an optical signal at the particular wavelength from an external device; and
   providing the single-mode oscillating wavelength optical signal from the light source to the external device.

15. The method of claim 14 including synchronizing a drive circuit to drive the motor and a control circuit to control a wavelength of the optical signal provided by the light source.

16. The method of claim 14 including causing coincidence between the extracted wavelength and the wavelength of the optical signal provided from the light source.

17. The method of claim 14 including attaining wavelength coincidence within a range of measurement during continuous and high-speed sweep.

* * * * *